(12) United States Patent
Bailey

(10) Patent No.: US 11,850,504 B2
(45) Date of Patent: Dec. 26, 2023

(54) PROCESS FOR THE ENHANCEMENT AND MODIFICATION OF A STOCK VIDEO GAME CONTROLLER

(71) Applicant: David Christopher Bailey, Amarillo, TX (US)

(72) Inventor: David Christopher Bailey, Amarillo, TX (US)

(*) Notice: Subject to any disclaimer, the term of this patent is extended or adjusted under 35 U.S.C. 154(b) by 0 days.

(21) Appl. No.: 18/047,556

(22) Filed: Oct. 18, 2022

(65) Prior Publication Data

US 2023/0127295 A1 Apr. 27, 2023

Related U.S. Application Data

(63) Continuation of application No. 16/415,662, filed on May 17, 2019, now Pat. No. 11,471,755, which is a continuation of application No. 15/187,117, filed on Jun. 20, 2016, now Pat. No. 10,307,668.

(60) Provisional application No. 62/181,422, filed on Jun. 18, 2015.

(51) Int. Cl.
*H05K 3/02* (2006.01)
*H05K 3/10* (2006.01)
*A63F 13/24* (2014.01)

(52) U.S. Cl.
CPC .................... *A63F 13/24* (2014.09)

(58) Field of Classification Search
CPC ....................................................... A63F 13/24
See application file for complete search history.

(56) References Cited

U.S. PATENT DOCUMENTS

| | | | |
|---|---|---|---|
| 8,932,135 B2* | 1/2015 | Coe | A63F 13/24 463/36 |
| 10,307,668 B2* | 6/2019 | Bailey | A63F 13/24 |
| 10,427,037 B2* | 10/2019 | Strahle | A63F 13/24 |
| 2011/0105231 A1* | 5/2011 | Ambinder | A63F 13/24 463/38 |

\* cited by examiner

*Primary Examiner* — Paul D Kim
(74) *Attorney, Agent, or Firm* — Michael L. Greenberg, Esq.; Greenberg & Lieberman, LLC

(57) ABSTRACT

Enhancements to existing gaming controllers facilitating expedient response time and fine-tuned accuracy are described. The enhancements comprise the internal modification of the stock resistance force supplied by the analog stick centering spring mechanism. Through modification, the force of resistance supplied may be increased to over 200 grams of force, or down to 40 grams of force, while maintaining full function of the analog stick mechanism. A second primary enhancement replaces the stock triggers, conventionally equipped with progressive resistance sensors, to a momentary 'snap-action' two-way switch, minimizing trigger pull distance, and removing the analog nature of the trigger to achieve optimal performance.

2 Claims, 9 Drawing Sheets

PROCESS FOR THE ENHANCEMENT AND MODIFICATION OF A STOCK VIDEO GAME CONTROLLER

This application is a Continuation application of Continuation patent application Ser. No. 16/415,662, filed on May 17, 2019, now U.S. Pat. No. 11,471,755, of non-provisional application Ser. No. 15/187,117 filed on Jun. 20, 2016, now U.S. Pat. No. 10,307,668, which is directed to provisional patent application No. 62/181,422, filed on Jun. 18, 2015, and priority is claimed thereto.

FIELD OF THE PRESENT INVENTION

The field of the present invention relates generally to instruments configured to facilitate the expert play of video games, and more specifically relates to enhanced video game controllers customized for expediency and accuracy, and configured for use in a professional competition setting.

BACKGROUND OF THE PRESENT INVENTION

A wide variety of gaming controllers exist on the market today. Many controllers are designed for specific purposes, having characteristics amenable to programmable functions, such as rapid-fire, and multiple-button combination buttons. These modifications are more akin to software modification to the perceived action of the button rather than enhancements to stock controllers themselves. However, many controllers, especially those built by the video game system manufacturers, are configured for durability and use by average game players, rather than for professionals that require more finesse, adjustments, and customization to their controllers to play their best. If professional players were equipped with more responsive and accurate controllers customized to their hands and calibrated with the analog stick tension required for expert play, players would excel even more.

Unfortunately, these features are not included by the manufacturers on their controllers, as it would be cost prohibitive, and likely, many of the average game players would not require the adjustment and versatility of a professional-level, calibrated controller. Similarly, the tension of the analog stick's 'return-to-center' spring or resistance spring is static, and is not originally configured to be customized easily. Many players have become accustomed to playing with controllers from the prior generation of gaming systems, such as the XBOX 360™ and PlayStation 3™, which employ controllers that vary from the newest generation platforms, namely the XBOX ONE™ and PlayStation 4™. The most noticeable variation that affects gameplay is that of the analog stick tension—namely, the force supplied by an internal spring mechanism within each analog stick that is configured to return the analog stick to a neutral center position after opposing forces are removed. Many players wish for the higher-tension analog stick assemblies that were present in the prior generation of controller hardware.

Additionally, many game players dislike the progressive, analog nature of the current generation of trigger switches conventionally disposed on the rear or bumper rim of the stock controller. Ultimately, the progressive nature of the trigger switches mandates that 100% power is not supplied until the trigger is depressed completely down, often up to 12 mm in trigger-pull distance. The large distance required to pull the trigger reduces response time, which can be critical in games that do not require the analog or progressive nature of stock trigger switches.

Thus, there is a need for enhancements to the conventional stock gaming controllers that provide for the custom modification of the internal resistance tension of the analog stick spring mechanism, as well as modify the switch assembly of the triggers such that they function as two-way switches with a minimal trigger-pull distance.

SUMMARY OF THE PRESENT INVENTION

The present invention is a system of enhancing popular stock gaming controllers with custom tuning options. The modifications of the present invention include two modifications made to stock gaming controllers which are not employed elsewhere on the market. The first part of enhancing an OEM stock branded controller (such as the Xbox One™, Xbox 360™, Sony PlayStation 3™, PlayStation 4™, Nintendo GameCube™, and WiiU™ controllers) into tuned competitive hardware requires modification to the analog stick mechanism(s).

The enhancements performed are configured to function on any OEM or stock controller that is equipped with a 2 axis, 3D potentiometer with a lever return mechanism, and any sort of linear trigger system. Conventionally, the factory return or resistance force of the analog sticks is roughly 60-65 grams of force which is conventionally provided by an internal spring mechanism. The modification of the present invention alters the stock force of 110 grams of force to 160, or may opt to lower the force of resistance down to 40 or 50 grams of force. It has been determined by internal research that the enhancements of the present invention can safely operate within 70-210 grams of force without losing significant function of the mechanical unit on the higher end, and 40-60 grams of force on the lower end.

The benefit of increasing the analog stick tension is to enable the player to have the option of more or less resistance feedback from the analog stick mechanism in accordance with the gameplay at hand. When the user is using analog stick caps of various heights, the perceived tension at the end of the analog stick cap is reduced. When the controller is equipped with the enhancements of the present invention, the tension adjustment will compensate for force lost by the use of a taller analog stick cap.

The second primary enhancement implemented is a momentary 'snap-action' switch configured to replace any and all progressive switches, namely analog triggers disposed on most OEM and aftermarket gaming controllers. Stock triggers and other switches equipped with a linear system are conventionally equipped with a progressive-type sensor configured with a trigger pull distance ranging from 8 to 12 mm. To maximize response time, the present invention reduces the functional trigger pull distance to between 0 and 2 mm. Additionally, the snap-action switch implemented is a two-way switch, rather than a variable voltage switch employed as standard with progressive-type sensors.

BRIEF DESCRIPTION OF THE DRAWINGS

The present invention will be better understood with reference to the appended drawing sheets, wherein.

DETAILED DESCRIPTION OF THE PREFERRED EMBODIMENT

Figure 1:
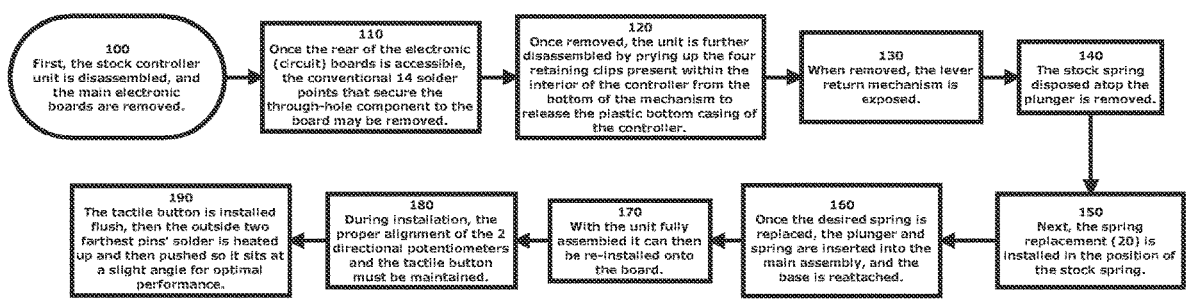
FIG. 1 displays a flow chart of the implementation process of the spring enhancements of the present invention.
Figure 2:
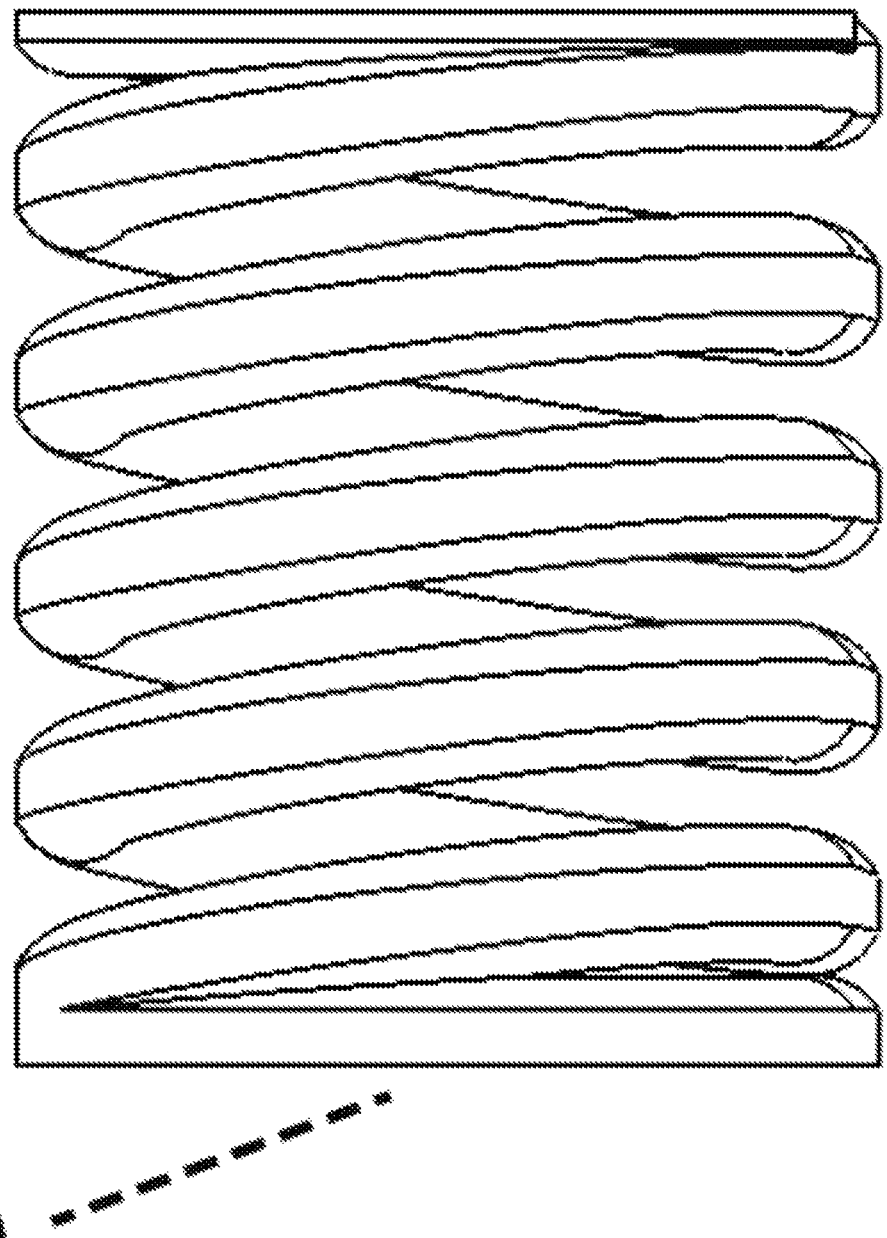
FIG. 2 exhibits a close-up view of the spring replacement of the present invention.
Figure 3:
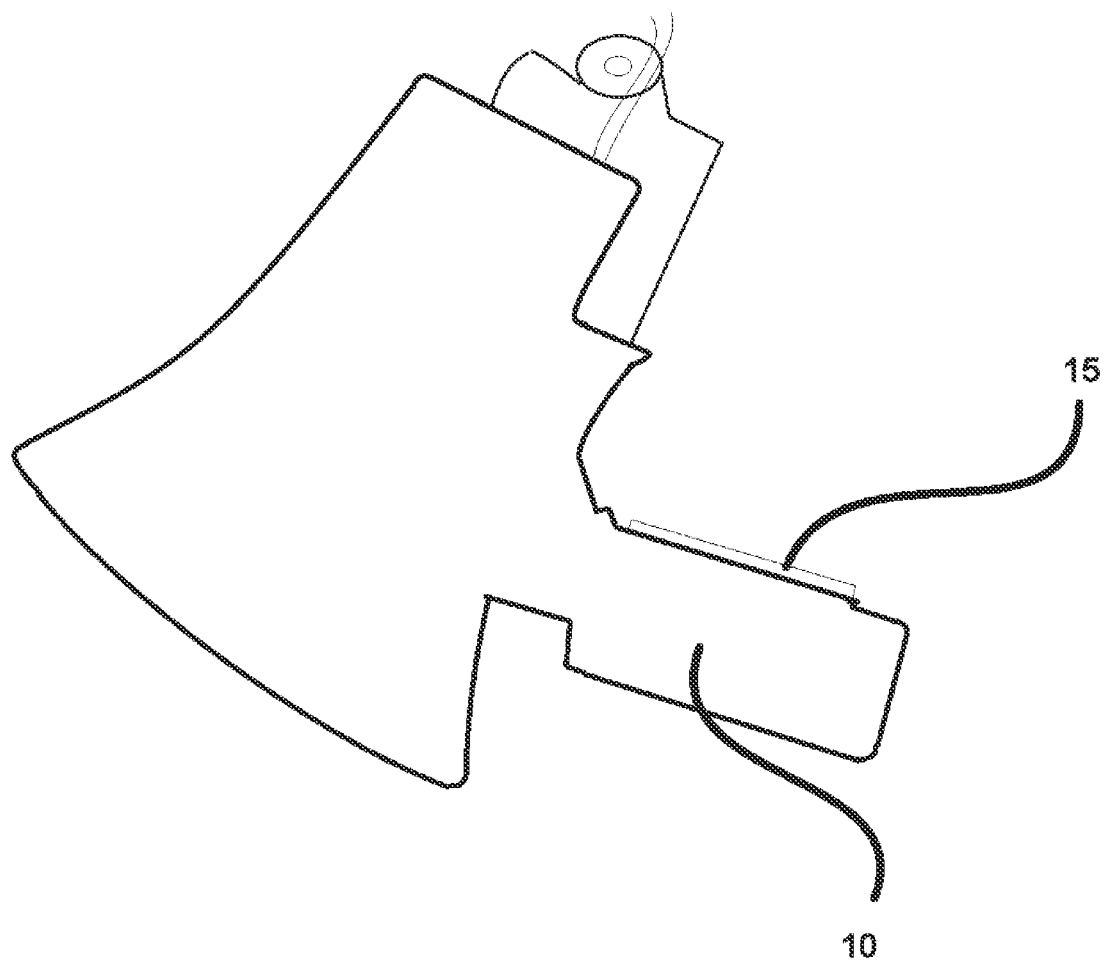
FIG. 3 displays a close-up view of the modified snap-action switch of the present invention that is exposed during the installation process noted in FIG. 4.
Figure 4:
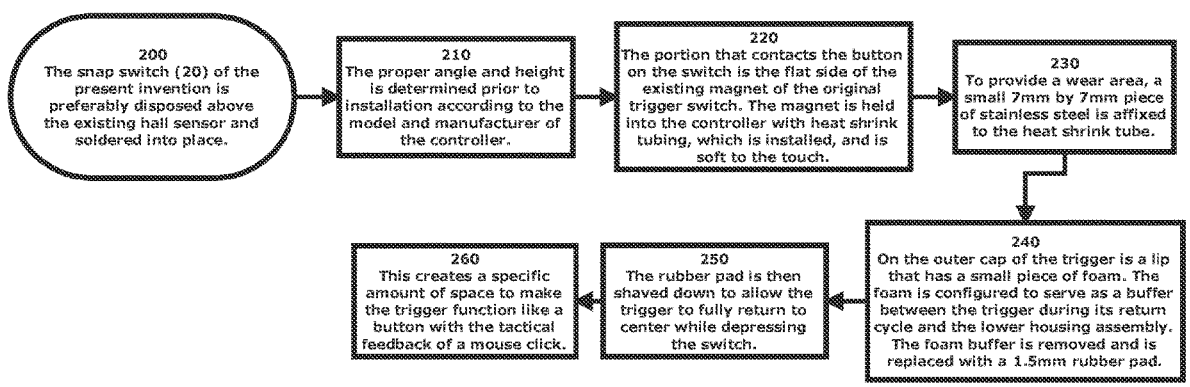
FIG. 4 is a flow chart depicting the process of installation of the snap-action switch of the present invention.
Figure 5:
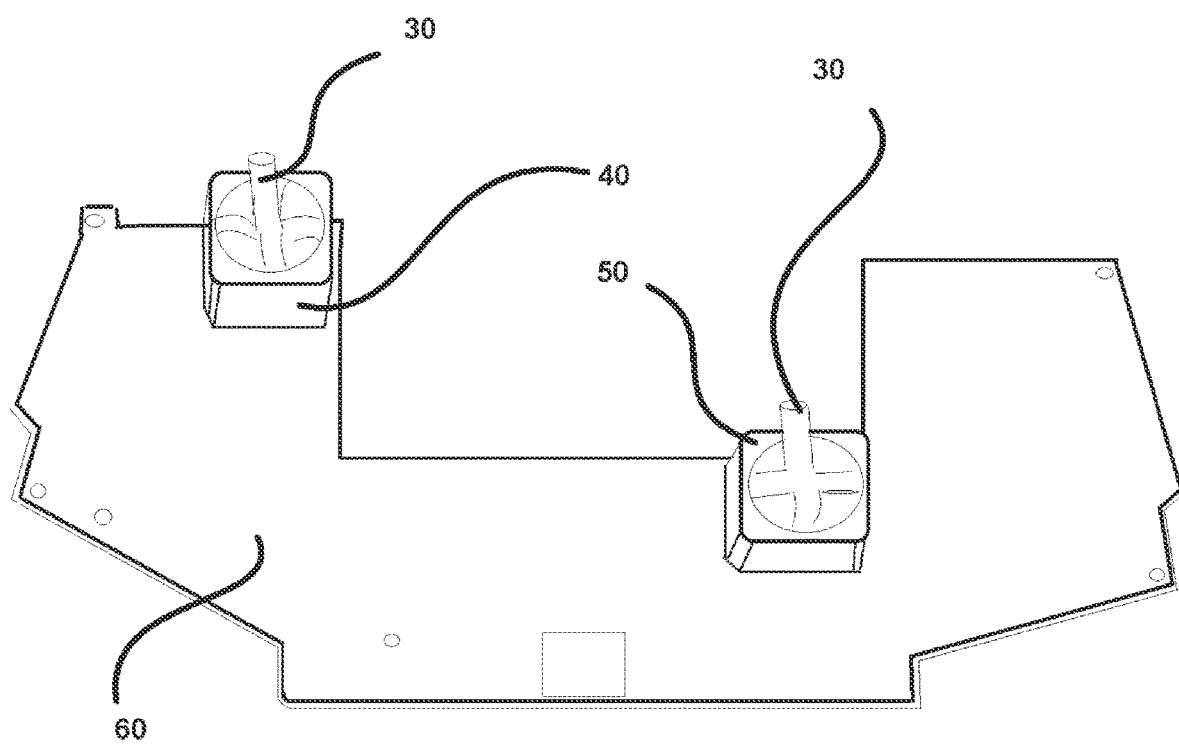
FIG. 5 is a top view of the control board of the stock controller.
Figure 6:
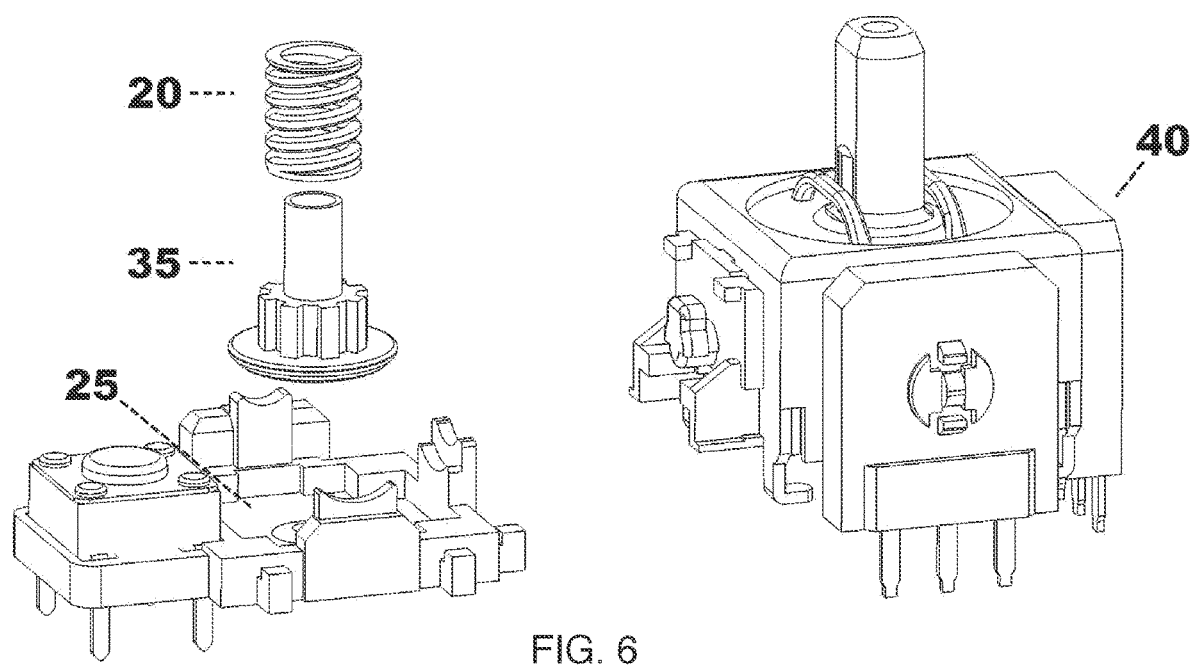
FIG. 6 depicts the components of the control stick modules which are modified after disassembly via the system of the present invention.
Figure 7:
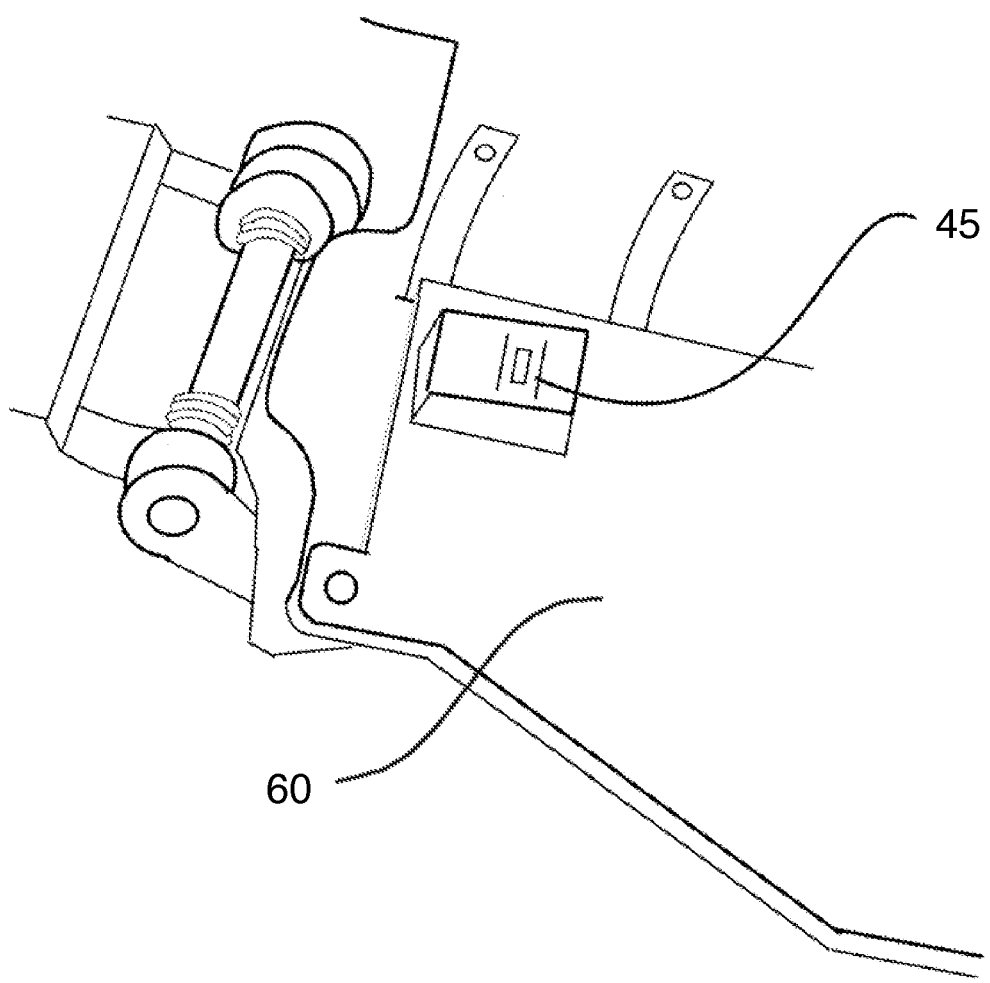
FIG. 7 displays the snap-action switch module affixed to a portion of the control board of the modified controller.

The present invention generally comprises a series of modifications made to a stock gaming controller configured to facilitate and enhance gameplay by minimizing the tactile response time of the buttons and increasing the resistance, and ultimately the accuracy, of the analog stick controls. The present invention primarily employs a 'snap-action' switch (10) (or snap switch) to increase the responsiveness of stock trigger buttons, as well as a spring replacement (20) to alter the stock tension of the analog sticks. The 'snap-action' switch (10) includes two primary components: a trigger equipped with a magnet (15) shown in FIG. 3, and a switch module (45) as shown in FIG. 7.

The Lever Return force or Return-to-Center force, often referred to as the analog stick tension, is modified by the enhancements of the present invention. The analog stick tension or resistance force should be understood as the amount of mechanical force the device exerts to either return to center, or resistance to be moved from a center position to an exterior movement.

The process of altering the analog stick tension includes several steps to achieve the desired enhancement. First, the stock controller unit is disassembled, and the main electronic boards are removed. (100) This includes the removal of the control board (60) for the controller from the outer casing of the controller. After removal, the control stick modules (40) are exposed. Once the rear of the control board (60) is accessible, the conventional 14 solder points that secure the through-hole component to the board may be removed. (110) The solder can be removed by adding lead solder to the solder points, and then using a desolder tool to free the control stick modules (40) from the control board. Once removed, the unit is further disassembled by prying up the four retaining clips present on the bottom of the control stick assembly (40) to release the plastic bottom base (25) of the control stick assembly (40). (120) When removed, the lever return mechanism is exposed. (130). The lever return mechanism is conventionally comprised of four main parts: a domed base in the center, a plastic circular plunger (35) disposed on the base configured to center on the domed portion, and a spring disposed atop the plunger and nestled within the main assembly (pin) of the analog stick. The stock spring disposed atop the plunger is removed. (140). Next, the spring replacement (20) is installed in the position of the stock spring. (150)

When the pin of the analog stick is pushed in a direction away from center, the plunger pushes in against the spring to create force, and when released, the analog stick returns to the center, neutral position. The present invention implements a spring replacement (20) configured to accurately increase the return center tension from the traditional 65 grams of force to 110 grams of force. With minor adjustments, the spring replacement (20) can provide additional tension between 160 grams of force to 210 grams of force, broadening the customization options of the player, and yielding more accurate gameplay. Other embodiments of the present invention configured to reduce the return tensions employ the factory spring, modified via compression, causing the spring-supplied return force to be deployed later in the cycle, thus bringing the tension down to about 40 grams force. Optionally, a replacement stick-click button may be installed to replace the stock stick-click button disposed at the center axis of each control stick assembly. The replacement of the stock stick-click button with a replacement stick-click button may be required to maintain the unmuffled 'click' sound which occurs when the control stick is pressed down on the central axis of the control stick. The replacement stick-click button preferably requires 20 g of force to activate and create the audible 'click' sound, preventing the muffled sound.

Once the desired spring is replaced, the plunger and spring are inserted into the main assembly, and the base is reattached. (160) A light film of glue may be used to reaffix the clips on the base (25). With the updated control stick assembly (40) fully assembled, it can then be re-installed onto the board. (170) During installation, the proper alignment of the 2 directional potentiometers and the tactile button must be maintained. (180) The tactile button is installed flush, then the outside two farthest pins' solder is heated up and then pushed so it sits at a slight angle for optimal performance. (190)

The benefit of the enhanced analog stick tension provided by the process of the present invention is that it provides the users the option of increased or decreased resistance feedback from the analog stick mechanism. When the user is using various heights of analog stick caps, the tension adjustment will compensate for force lost by the use of a taller cap.

The second portion of the adjustments to gaming controllers is performed on the trigger assembly themselves. On a controller that has a linear potentiometer, Linear Hall Effect, or other progressive resistance sensor the user will experience different trigger values at different trigger pulls. Similar to the gas pedal in a vehicle, as it is pressed harder, the vehicle moves at an increased speed. The sensor, electronically will register a different voltage output based on position. Not all users prefer to have a progressive sensor in their gaming hardware. Where in some instances, the amount of travel may be 8-12 mm to register from 0% to 100% trigger pull.

The enhancements of the present invention are comprised of several steps to replace the conventional linear system with that of a momentary snap-action switch. The snap-action switch of the preferred embodiment of the present invention is configured to replace the stock progressive-type sensor with a two-way snap-action circuit switch. The snap-action switch is a critical portion of the enhancement; yet, in order to ensure that it functions properly, several other components are employed. The snap-action switch is positioned at a pre-determined height and angle depending on the stock controller supplied for modification. For example the Xbox One™ stock controller employs a Linear Hall Effect sensor that is soldered onto the back of the main logic board. The Linear Hall Effect sensor has a magnet attached to the rear chassis of the trigger assembly. As the trigger is pulled, the magnet moves closer to the Linear Hall Effect sensor, and provides varying resistance.

The switch module (45) snap-action switch (10) of the present invention is preferably disposed above the existing hall sensor and soldered into place as shown in FIG. 7. (200) The proper angle and height is determined prior to installation according to the model and manufacturer of the controller. (210) The portion that contacts the button on the switch is the flat side of an original magnet (15) of the original trigger switch. The supplemental magnet is held onto the controller with heat shrink tubing, which is installed, and is soft to the touch. (220) To provide a wear area, a small 7 mm by 7 mm piece of stainless steel is affixed to the heat shrink tube. (230) As the trigger moves, the stainless pad will press and depress the switch. On the outer cap of the trigger is a lip that has a small piece of foam. The foam is configured to serve as a buffer between the trigger during its return cycle and the lower housing assembly. The foam buffer is removed and is replaced with a 1.5 mm rubber pad. (240) The rubber pad is then shaved down to allow the trigger to fully return to center while depressing the switch. (250) This creates a specific amount of space to make the trigger function like a button with the tactical feedback of a mouse click. (260)

The player then preferably employs this modification to accomplish two things: firstly, this enhancement of the present invention provides a significantly shorter trigger pull distance, set initially between 8-12 mm, down to about 0.5-2 mm distance. Due to the shorter distance the trigger is required to travel to reach 100% action on the switch, the user can input the function at a quicker pace. Then instead of simply limiting the trigger pull, the snap-action switch (10), when pressed, creates a circuit that registers at full resistance, mimicking 100% of the trigger pull. Within the 0.5-2 mm trigger pull the user experiences the same beginning and ending function as the original without the longer pull and without the linear ramp up needed to achieve full power on the stock switch.

The technical specifications of the preferred embodiment of the spring replacement (20) of the present invention are roughly as follows:

| | | |
|---|---|---|
| Solid Length: | 0.1140 | in. |
| Solid Load: | 2.667 | Lbf |
| Solid Stress: | 157760 | Lbf/in^2 |
| Stress Factor: | 1.216 | |
| Active Coils: | 3.000 | |
| Spring Index: | 6.895 | |
| Helix Angle: | 7.064 | Degrees |
| Spring Pitch: | 0.05100 | in. |
| Inside Diameter: | 0.1120 | in. |
| Mean Coil Diameter: | 0.1310 | in. |
| Wire Length: | 2.068 | in. |
| Weight/1000: | 0.1665 | Lb |
| Natural Frequency: | 311712 | RPM |
| Wire Diameter: | 0.01900 | in. |
| Outside Diameter: | 0.1500 | in. |
| Total Coils: | 5.0 | |
| Spring Rate: | 27.777 | Lbf/in (calculated) |
| Free Length: | 0.2100 | in. |
| Length (in operation): | 0.1567 | |
| Load (in operation): | 1.481 | |
| Deflection: | 0.05330 | |
| Stress | 87590 | |
| Outer Diameter Expansion: | 0.0007432 | |

Figure 8:
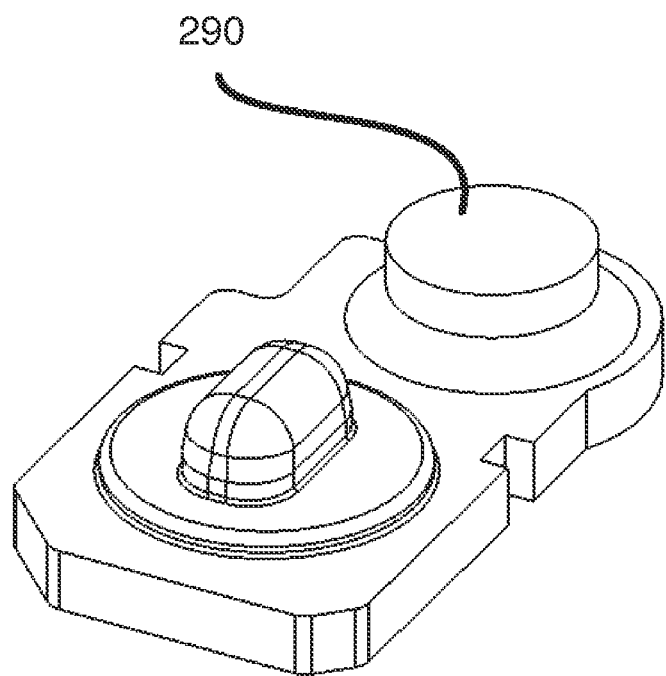
FIG. 8 depicts a view of the rubber contact pad of the present invention, shown isolated from the controller and switch.
Figure 9:
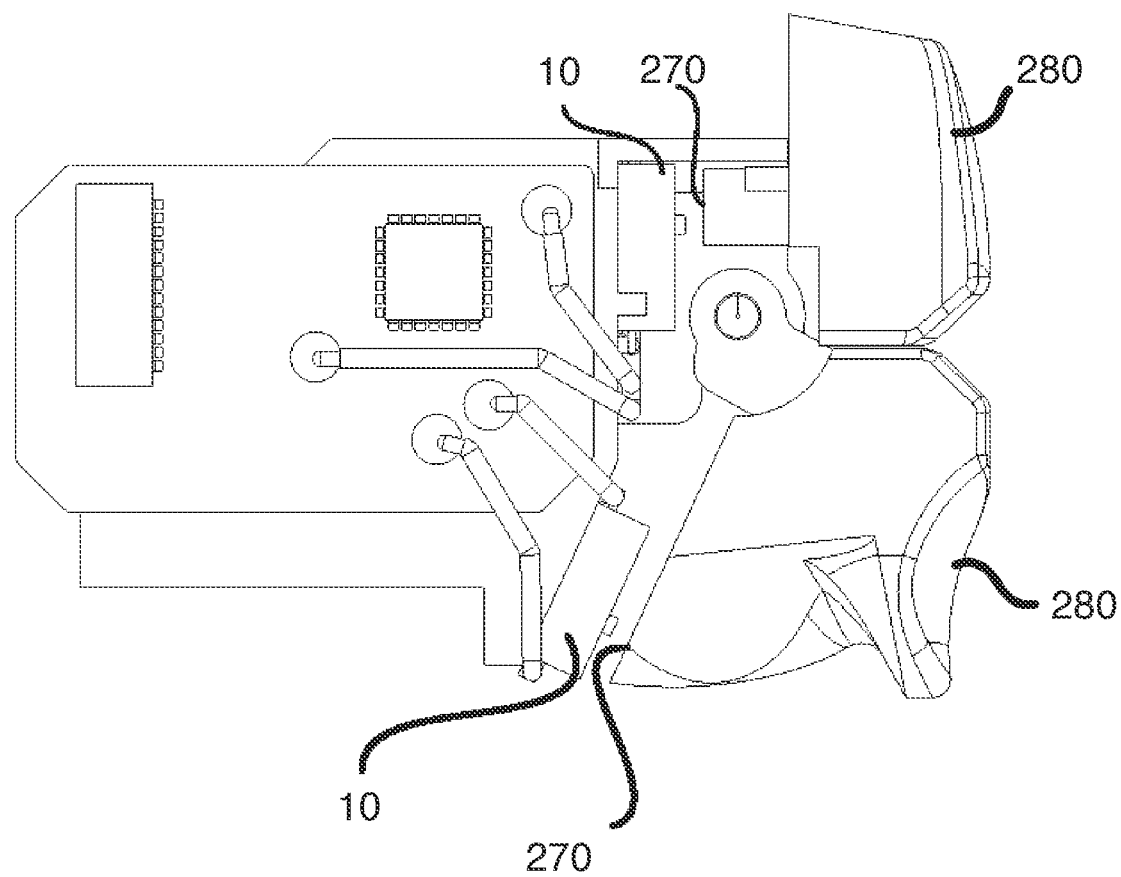
FIG. 9 shows a view of the non-stock switch of the present invention, depicting the wear area and striking surface on which the switch presses, as well as a second striking surface of the present invention.

It should be noted that FIG. 9 depicts a view of the two instances of the non-stock switch (10), shown adjacent to corresponding striking surfaces (270) and stock shoulder buttons (280). FIG. 8 exhibits an isolated view of a rubber contact pad (290) of the present invention.

It should be understood that the process of implementation of the enhancements of the present invention may vary slightly between popular gaming controllers for differently branded gaming consoles. In the current instantiation and generation of gaming controllers for gaming consoles and computers, the process of implementation is largely the same across manufacturers.

Having illustrated the present invention, it should be understood that various adjustments and versions might be implemented without venturing away from the essence of the present invention. Further, it should be understood that the present invention is not solely limited to the invention as described in the embodiments above, but further comprises any and all embodiments within the scope of this application.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The exemplary embodiment was chosen and described in order to best explain the principles of the present invention and its practical application, to thereby enable others skilled in the art to best utilize the present invention and various embodiments with various modifications as are suited to the particular use contemplated.

I claim:

1. A process for the enhancement and modification of a stock video game controller comprising:
    disassembling the controller;
    replacing any and all stock progressive-type sensors with two-way snap-action circuit switches;
    disposing a striking surface in communication with the controller;
    connecting the two-way snap-action circuit switches to a control board of the controller; and
    reassembling the controller.

2. A process for the enhancement and modification of a stock video game controller comprising:
    disassembling the controller;
    replacing any and all stock progressive-type sensors with two-way snap-action circuit switches;
    disposing a striking surface on the controller;
    connecting the two-way snap-action circuit switches to a control board of the controller;
    reassembling the controller;
    wherein striking the striking surface with the two-way snap-action switches provides a contact point that is configured to press and depress the two-way sanp0action switches.

* * * * *